United States Patent
Newman et al.

(10) Patent No.: US 8,991,378 B2
(45) Date of Patent: Mar. 31, 2015

(54) GAS PRESSURE REGULATOR WITH IN-SITU ROTATABLY ADJUSTABLE ADAPTOR SLEEVE

(71) Applicants: Shmuel Dovid Newman, Redondo Beach, CA (US); Jeffrey O. Brown, North Logan, UT (US)

(72) Inventors: Shmuel Dovid Newman, Redondo Beach, CA (US); Jeffrey O. Brown, North Logan, UT (US)

(73) Assignee: YSN Imports, Inc., Gardena, CA (US)

( * ) Notice: Subject to any disclaimer, the term of this patent is extended or adjusted under 35 U.S.C. 154(b) by 16 days.

(21) Appl. No.: 13/904,921

(22) Filed: May 29, 2013

(65) Prior Publication Data

US 2013/0319390 A1 Dec. 5, 2013

Related U.S. Application Data

(60) Provisional application No. 61/652,494, filed on May 29, 2012.

(51) Int. Cl.
  *F41B 11/72* (2013.01)
  *F41B 11/724* (2013.01)
(52) U.S. Cl.
  CPC .............. *F41B 11/72* (2013.01); *F41B 11/724* (2013.01)
  USPC ............................................ 124/73; 124/71
(58) Field of Classification Search
  USPC ................................. 124/70–76, 56
  See application file for complete search history.

(56) References Cited

U.S. PATENT DOCUMENTS

| | | | | |
|---|---|---|---|---|
| 2,320,969 | A | * | 6/1943 | Kromer et al. ................. 222/61 |
| 3,211,175 | A | * | 10/1965 | Replogle ..................... 137/493 |
| 4,872,830 | A | * | 10/1989 | Katchka et al. ................ 431/54 |
| 5,348,037 | A | | 9/1994 | Katchka |
| 6,152,125 | A | * | 11/2000 | Piper ............................... 124/59 |
| 6,554,322 | B2 | | 4/2003 | Duong et al. |
| 7,309,113 | B2 | * | 12/2007 | Carter ....................... 303/119.1 |
| 7,748,407 | B2 | | 7/2010 | Colby |
| 8,171,950 | B2 | | 5/2012 | Colby et al. |
| 2001/0050076 | A1 | * | 12/2001 | Colby ............................ 124/74 |
| 2006/0249132 | A1 | | 11/2006 | Gabrel |
| 2008/0210210 | A1 | * | 9/2008 | Colby ............................ 124/73 |
| 2009/0078321 | A1 | * | 3/2009 | Arnott et al. .................... 137/14 |
| 2010/0175763 | A1 | | 7/2010 | Newman et al. |
| 2011/0056472 | A1 | * | 3/2011 | Stone ............................. 124/74 |
| 2014/0165984 | A1 | * | 6/2014 | Colby ............................ 124/73 |

* cited by examiner

*Primary Examiner* — Michael David
(74) *Attorney, Agent, or Firm* — Lance M. Pritikin

(57) ABSTRACT

Exemplary embodiments of a gas pressure regulator comprise a regulator body, an adaptor sleeve, a retainer and an indexing ring. The regulator body includes a proximal portion, a distal portion, a ported intermediate portion therebetween, and a main bore. The adaptor sleeve axially receives the distal portion and includes an outer threading for engaging an air source adaptor of a paintball marker. The retainer threadably engages the main bore within the distal end, thereby axially securing the adaptor sleeve onto the distal end. The indexing ring receives the distal portion therethrough for resiliently biased axial movement of the indexing ring between a locking position and an unlocking position. When the indexing ring is in its unlocking position, the adaptor sleeve is rotatable with respect to the regulator body. When the indexing ring is in its locking position, the adaptor sleeve is rendered substantially non-rotatable with respect to the regulator body.

20 Claims, 3 Drawing Sheets

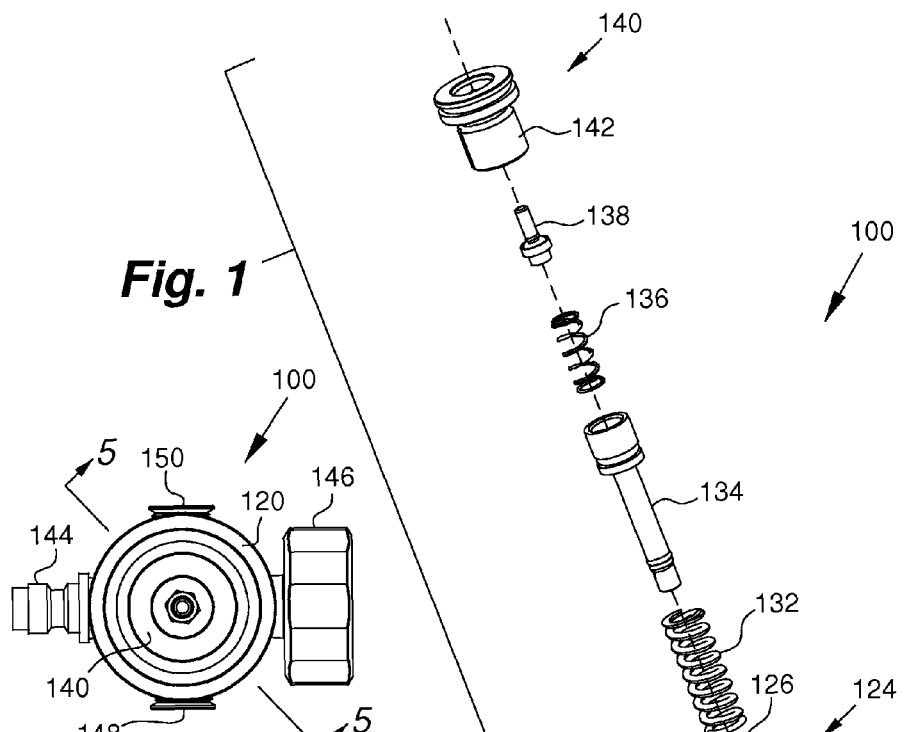
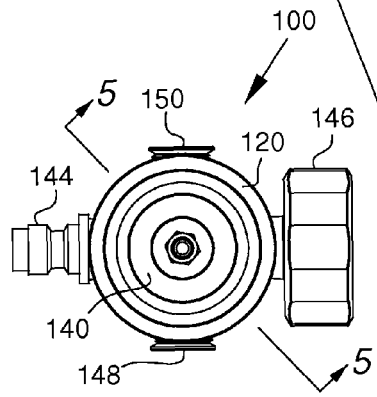
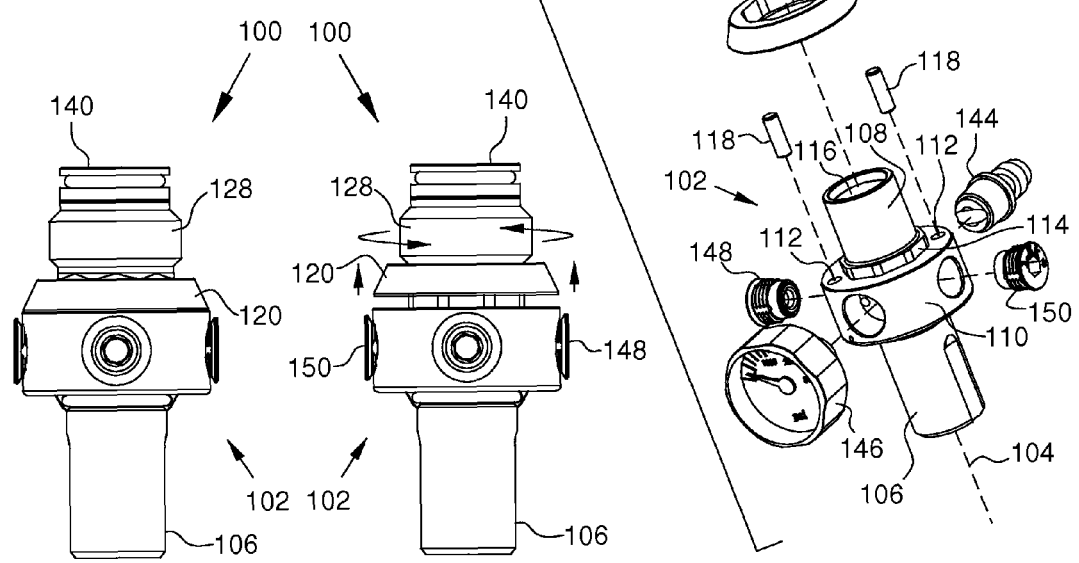

GAS PRESSURE REGULATOR WITH IN-SITU ROTATABLY ADJUSTABLE ADAPTOR SLEEVE

RELATED APPLICATIONS

This application claims the benefit of U.S. Provisional Application No. 61/652,494 filed May 29, 2012, the content of which is incorporated by this reference in its entirety for all purposes as if fully set forth herein.

TECHNICAL FIELD

The present invention relates generally to gas pressure regulators for regulating pressure from reservoirs storing compressed fluids, particularly where such regulators are used in association with the sport of paintball.

BACKGROUND

Pressure regulators are commonly relied on to reduce the pressure of a gas as it is delivered from a pressurized gas reservoir, such as a portable compressed air tank, to an application device, such as a paintball marker. Paintball markers may feature a gas pressure regulator directly connected to the mouth of a tank designed to store gasses at very high pressures, typically between 3000-4500 psi. Commonly referred to as "tank regulators," these gas pressure regulators may reduce the pressure of the gas delivered from the tank down to, for example, 600-800 psi before the gas enters portions of the paintball marker for use in firing a projectile.

Paintball markers commonly include an air source adapter (ASA) non-rotatably affixed to the paintball marker. A tank pressure regulator, which is typically affixed to a paintball tank for regulating pressurized air flowing from the tank, must be tightly threaded into the ASA. The bodies of such regulators typically include one or more fixed radially protruding features, like a pressure gauge and/or fill nipple. In certain positions, such features may present undesirable or injurious obstructions for the paintball player, increase the risk of damage to the feature, or make it awkward for the player to view the feature (such as a pressure gauge). Historically, a player using a typical conventional tank regulator was unable to predict or adjust the location of such radially protruding features because the rotational orientation of the threading on both the regulator and the ASA were classically pre-defined and non-adjustable. The applicant has proposed previous solutions to this problem, as illustrated for example in U.S. patent application Ser. No. 12/687,031, which published as US20100175763. However, in order to rotatably adjust the adaptor sleeve in such prior solutions, one was required to remove the ASA from the adaptor sleeve and depressurize the regulator. Such requirements make it impractical to rotatably adjust the respective adaptor sleeve in the middle of a game.

What is needed is a gas pressure regulator for use in paintball marker applications wherein the threaded adaptor sleeve can quickly be selectively rotated to various rotational indices without requiring depressurization of the regulator or removal of the ASA from the regulator. Preferably, such rotational adjustability should be possible without the need for tools.

SUMMARY

Certain deficiencies of the prior art may be overcome by the provision of one or more embodiments of a gas pressure regulator. Embodiments of such a regulator may preferably include a regulator body, an adaptor sleeve, a retainer element and an indexing ring. The regulator body may include a proximal portion, a distal portion and an intermediate portion generally therebetween. A main bore extends through the regulator body from the proximal portion to the distal portion. The proximal portion is typically adapted to be received by a pressurized gas reservoir in sealed engagement therewith. The adaptor sleeve is configured to axially receive the distal portion and includes an outer threading adapted to threadably engage a fixture of a device requiring pressurized gas for its operation (such as an air source adaptor of a paintball marker). The retainer element typically includes a threaded portion adapted to threadably engage the main bore generally within the distal portion, thereby axially securing the adaptor sleeve onto the distal portion. The indexing ring is preferably adapted to receiving the distal portion therethrough for axial movement of the thread indexing ring between a locking position and an unlocking position. When the thread indexing ring is in its unlocking position, the adaptor sleeve is rotatable with respect to the regulator body. When the indexing ring is in its locking position, the adaptor sleeve is rendered substantially non-rotatable with respect to the regulator body.

In preferred embodiments, the thread indexing ring is resiliently biased toward its locking position, the bias adapted to being overcome by direct manipulation by an operator of the device. The bias may be provided by magnetic interaction, or spring force. The magnetic interaction may be an attractive magnetic force occurring generally between, for example, the thread indexing ring and one or more magnets. Such magnets may be secured substantially within the intermediate portion of the regulator body. Alternatively, the magnetic interaction may be a repulsive magnetic force occurring, for example, generally between the thread indexing ring and the outer threading. In further alternative or in addition, such resilient bias may be provided by a spring element.

Preferred embodiments provide a gas pressure regular wherein the thread indexing ring may be manually slid into its unlocking position, thereby allowing the adaptor sleeve to be selectively rotated to any of a plurality of indexed orientations even while the gas pressure regulator remains in a pressurized state, and without requiring the removal of the air source adaptor from the regulator.

In embodiments, the intermediate portion may include at least two generally radially-extending ports in fluid communication with the main bore, the ports respectively being adapted to removably receive a pressure gauge and a fill nipple assembly. Moreover, embodiments may typically include a shuttle subassembly operably housed generally within the main bore, and a poppet subassembly operably housed generally within the retainer element. The shuttle subassembly may include a shuttle rod and a shuttle spring. The poppet subassembly may include a poppet element and a poppet spring.

In certain embodiments, the regulator body includes a first engagement portion, the thread indexing ring includes a second engagement portion, and the adaptor sleeve includes a third engagement portion. The second engagement portion may be configured to be in simultaneous non-rotatable engagement with the first and third engagement portions when the indexing ring is in its locking position. The second engagement portion may be configured to be out of the simultaneous non-rotatable engagement when the indexing ring is in its unlocking position. In particular such embodiments, the first, second and third engagement portions may each have a respective generally polygonal cross section, and those cross sections may be substantially identical to one another.

A paintball marker system may comprise a paintball marker with an air source adaptor (ASA), a reservoir for pressurized gas (e.g., a portable tank) and a gas pressure regulator (e.g., a tank regulator) in fluid communication between the ASA and the reservoir.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 1 is a diagrammatic exploded view of one embodiment of a gas pressure regulator in accordance with the present invention;

FIG. 2 is a diagrammatic end view of the embodiment of FIG. 1, but shown in collapsed form;

FIG. 3 is a diagrammatic side view of the embodiment shown in FIG. 2, illustrating a thread indexing ring in its locking position, whereby the threaded adaptor sleeve is rotationally fixed with respect to the regulator body;

FIG. 4 is a diagrammatic side view similar to that shown in FIG. 3, but in which the thread indexing ring has been axially moved to its unlocking position, thereby allowing the threaded adaptor sleeve to be rotated to a more preferable rotationally indexed orientation;

DETAILED DESCRIPTION OF THE PREFERRED EMBODIMENTS

Figure 5:
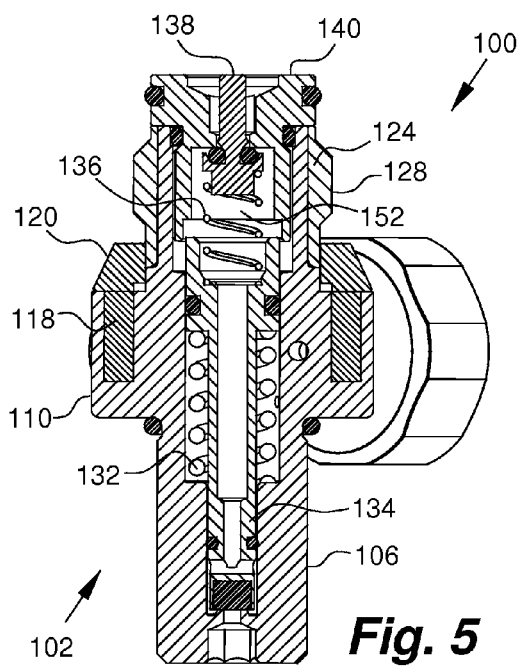
FIG. 5 is a diagrammatic cross-sectional view taken along line 5-5 in FIG. 2, illustrating the thread indexing ring in its locking position and the shuttle rod in its pressurized configuration.

Referring now to the drawings, like reference numerals designate identical or corresponding features throughout the several views. Shown generally at 100 are one or more example embodiments of a pressure regulator in accordance with the present invention, each of which may generally comprise a regulator body 102, an adaptor sleeve 124, a retainer element 140 and a thread indexing ring 120. The regulator body 102 may include a main bore 116 extending therethrough from its proximal portion 106 through its distal portion 108. In most preferred embodiments, the main bore 116 is adapted to operably receive a shuttle spring 132, a shuttle rod 134, a poppet spring 136, a poppet 138 and an externally threaded portion 142 of a retainer element 140.

In embodiments such as those shown herein, for example, the pressure regulator 100 may be preferably adapted for use in regulating pressurized gas from a pressurized gas reservoir, such as a compressed air tank (not shown). Such embodiments are preferably further adapted to supply the regulated pressurized gas to a device such as a paintball marker by way of, for example, an air source adaptor (ASA) or similar interface with a threaded female fitting (not shown).

An intermediate portion 110 may typically be disposed between the proximal portion 106 and the distal portion 108, and include respective ports adapted to removably receive one or more of a fill nipple assembly 144, a pressure gauge 146, a high-side burst plug 148 and a low-side burst plug 150. The regulator body 102 is generally adapted to place such external features in fluid communication with an appropriate channel or chamber. For example, in operation, the fill nipple assembly 114, pressure gauge 146 and high-side burst plug assembly 148 may be in fluid communication with the pressurized gas reservoir via respective channels within the proximate portion 106. Similarly, the low-side burst disk assembly 150 may be in fluid communication with the output chamber 152. The proximal portion 106 may be adapted to be received in sealed engagement by, for example, the neck of a pressurized gas reservoir. Moreover, the proximal portion 106 may typically include external threading (not shown) for threaded receipt of the proximal portion 106 by an internally threaded reservoir neck.

The adaptor sleeve 124 may include a sleeve bore 126 through which the distal portion 108 may be axially received in generally freely rotatable fashion. The adaptor sleeve 124 also typically includes an outer threading 128 adapted to threadably engage a fixture of a device requiring pressurized gas for its operation, such as an ASA adaptor of a paintball marker. Further, the adaptor sleeve typically includes a third engagement portion 130, which may, in particular embodiments, substantially match the cross-section of the first engagement portion (for example, by include the same number of sides or alternative torsion detent elements).

Figure 7:
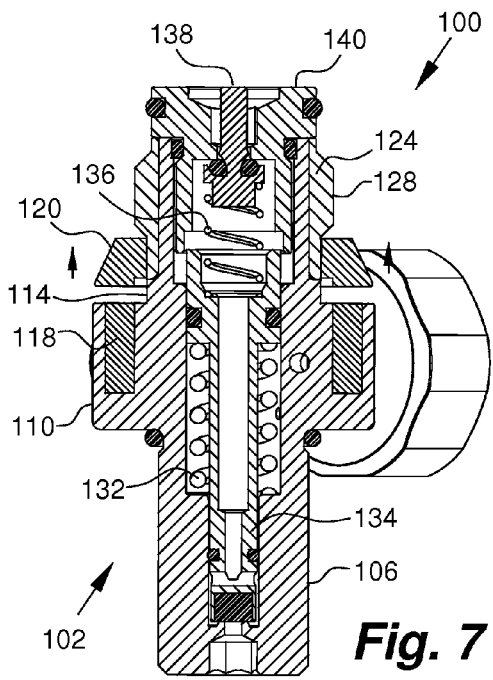
FIG. 7 is a diagrammatic cross-sectional view similar to that of FIG. 5, but in which the thread indexing ring has been axially moved to its unlocking position while the shuttle rod remains in its pressurized configuration.
Figure 8:
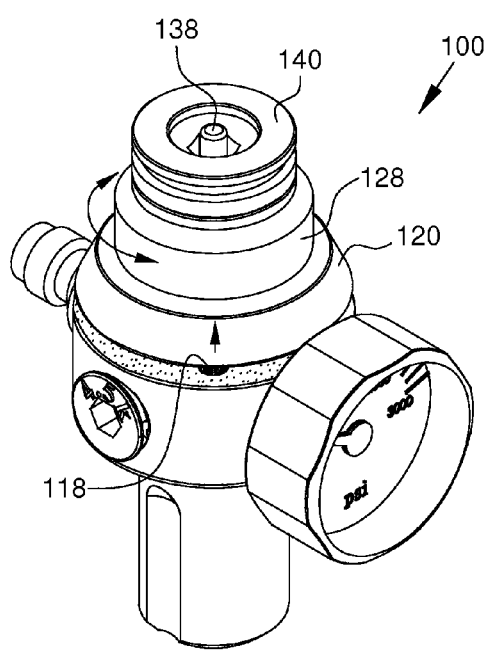
FIG. 8 is a diagrammatic perspective view of the embodiment shown in FIG. 7, illustrating the thread indexing ring having been axially moved to its unlocking position and thereby allowing the threaded adaptor sleeve to be rotated along with the indexing ring to a selected rotationally indexed orientation even while the regulator remains fully pressurized.
Figure 9:
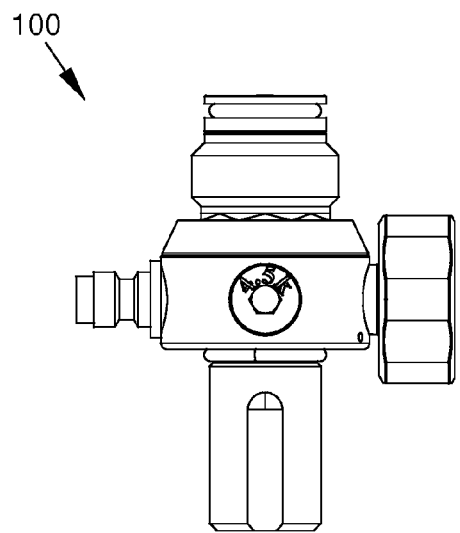
FIG. 9 is a further diagrammatic side view of the embodiment shown in FIG. 3.
Figure 10:
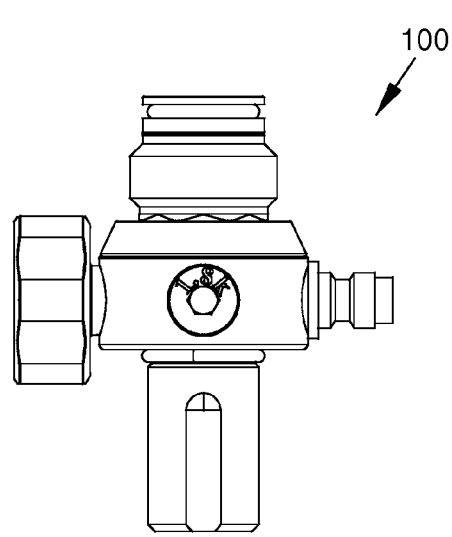
FIG. 10 is a further diagrammatic side view of the embodiment shown in FIG. 9, but shown from the opposite side.
Figure 11:
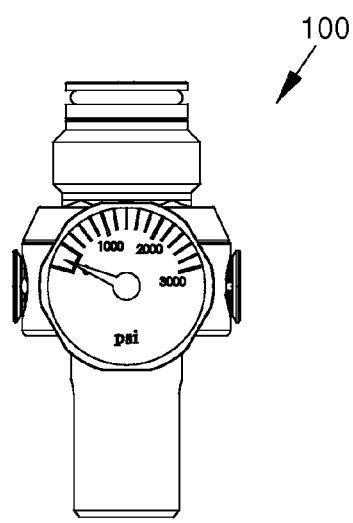
FIG. 11 is a further diagrammatic side view of the embodiment shown in FIG. 3, but shown from the opposite side.

The thread indexing ring 120 may include a second engagement portion 122 and be adapted to receive, for example, the distal portion 108 for axial movement of the thread indexing ring 120 between a locking position (as shown, for example, in FIGS. 3, 5 and 6) and an unlocking position (as shown, for example, in FIGS. 4, 7 and 8). In typical embodiments, the adaptor sleeve 124 is rotatable with respect to the regulator body 102 when the thread indexing ring 120 is in its unlocking position. Contrastingly, in such embodiments, the adaptor sleeve 124 is typically non-rotatably fixed with respect to the regulator body 102 when the thread indexing ring 120 is in its locking position. In certain preferred embodiments, second engagement portion 122 may cooperate with and substantially match the cross-sections of the first engagement portion 114 and third engagement portion 130. Such cross sections may be polygonal or take some alternative but equivalent form. It is understood that variations can be made in the shape of such cross-sections while providing the same torsion indexing and locking function enabled by the disclosure herein.

Figure 6:
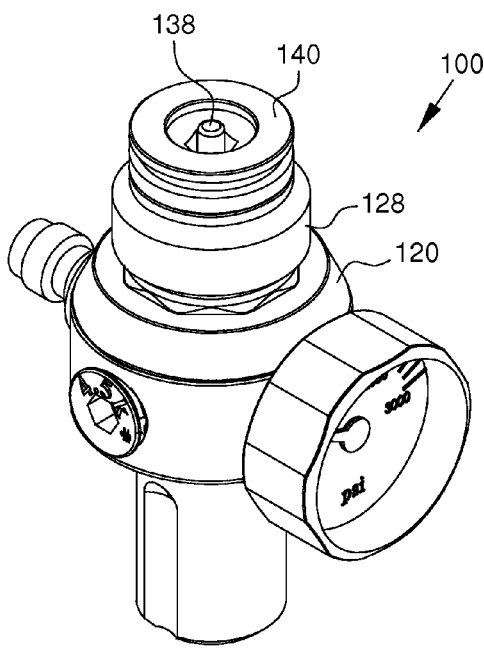
FIG. 6 is a diagrammatic perspective view of the embodiment shown in FIG. 5.

In preferred embodiments, the thread indexing ring 120 is biased toward its locking position. Such bias may preferably be overcome by direct manipulation of the thread indexing ring 120 by the operator of the device without the need for tools. In one or more embodiments, such bias may be provided by magnetic interaction. For example, as illustrated in FIGS. 1, 5 and 7, such bias may be established between one or more magnets 118 and the thread indexing ring 120, which may itself be made substantially of steel, other ferromagnetic material or alternative material substantially attracted to magnetic fields. In particular embodiments, the magnets 118 may, for example, be of the Neodymium type, and may be fixedly received within respective magnet wells 112. A magnet 118 may be secured within a magnetic well 112 by way of press fit, adhesive bond, or similar securing means. The magnet wells 112 or equivalent structures may preferably be disposed within intermediate portion 110 of the body 102. Additionally or in the alternative, the bias may be provided by, for example, one or more compression springs, leaf springs or other conventional resilient or elastic biasing means.

In preferred embodiments, the retainer element 140 may include a threaded portion 128 adapted to threadably engage the main bore 116 generally within the distal portion 108 for axially securing the adaptor sleeve 124 onto the distal portion 108. Accordingly, in such embodiments, once the regulator 100 is fully-assembled, the retainer element 140 typically substantially restrains the adaptor sleeve 124 from moving axially along the distal portion 108.

In operation, preferred embodiments of a gas pressure regulator 100 in accordance with the present invention allow the regulator body 102 (and the attached reservoir) to be quickly and conveniently rotational unlocked, selectively rotated to any of a multiplicity of rotational orientations with respect to the device fitting, then locked in that new orientation. Moreover, such rotational adjustment can now be made "on the fly" for the purpose of, for example, selectively re-positioning the fill nipple or pressure gauge without having to depressurize the regulator or unthread and detach the device fitting from the adaptor sleeve 124. Using the embodiments shown in the several drawings, for example, an operator of the disclosed regulator can simply axially slide the thread indexing ring 120 toward its unlocking position, rotate the regulator body 102 to a preferred rotational index, and release the thread indexing ring 120 to return to its locking position. Thus, embodiments of a regulator as discussed herein allow an operator to accomplish in mere seconds what would previously render the paintball marker temporarily inoperable for several minutes, require a tool and present the risk of losing internal regulator parts out in the field.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gas pressure regulator comprising:
a regulator body including a proximal portion, a distal portion and an intermediate portion generally therebetween, a main bore extending through the regulator body from the proximal portion through the distal portion, the proximal portion being adapted to be received by a pressurized gas reservoir in sealed engagement therewith;
an adaptor sleeve for axially receiving the distal portion and including an outer threading adapted to threadably engage a fixture of a device requiring pressurized gas for its operation;
a retainer element including a threaded portion adapted to threadably engage the main bore generally within the distal portion thereby axially securing the adaptor sleeve onto the distal portion; and
a thread indexing ring adapted to receiving the distal portion therethrough for axial movement of the thread indexing ring between a locking position and an unlocking position, wherein the adaptor sleeve is rotatable with respect to the regulator body when the thread indexing ring is in its unlocking position, and the adaptor sleeve is rendered substantially non-rotatable with respect to the regulator body when the thread indexing ring is in its locking position.

2. A gas pressure regulator as defined in claim 1 wherein the thread indexing ring is resiliently biased toward its locking position, the bias adapted to being overcome by direct manipulation by an operator of the device.

3. A gas pressure regulator as defined in claim 2 wherein the bias is provided by magnetic interaction.

4. A gas pressure regulator as defined in claim 3 wherein the magnetic interaction is an attractive magnetic force occurring generally between the thread indexing ring and one or more magnets.

5. A gas pressure regulator as defined in claim 4 wherein the one or more magnets are secured substantially within the intermediate portion.

6. A gas pressure regulator as defined in claim 5 wherein the thread indexing ring is made substantially of a ferromagnetic material.

7. A gas pressure regulator as defined in claim 3 wherein the magnetic interaction is a repulsive magnetic force occurring generally between the thread indexing ring and the outer threading.

8. A gas pressure regulator as defined in claim 2 wherein the bias is provided by a spring element.

9. A gas pressure regular as defined in claim 1 wherein when the thread indexing ring in its unlocking position the adaptor sleeve is selectively rotatable to any of a plurality of indexed orientations even while the gas pressure regulator remains in a pressurized state.

10. A gas pressure regulator as defined in claim 1 wherein the intermediate portion includes at least two generally radially-extending ports in fluid communication with the main bore, the ports respectively being adapted to removably receive a pressure gauge and a fill nipple assembly.

11. A gas pressure regulator as defined in claim 1 wherein the fixture is an air source adaptor of a paintball marker.

12. A gas pressure regulator as defined in claim 1 further comprising:
a shuttle subassembly operably housed generally within the main bore, the shuttle subassembly including a shuttle rod and a shuttle spring; and
a poppet subassembly operably housed generally within the retainer element, the poppet subassembly including a poppet element and a poppet spring.

13. A gas pressure regulator as defined in claim 1 wherein:
the regulator body includes a first engagement portion;
the thread indexing ring includes a second engagement portion;
the adaptor sleeve includes a third engagement portion;
the second engagement portion being in simultaneous non-rotatable engagement with the first and third engagement portions when the thread indexing ring is in its locking position; and
the second engagement portion being out of the simultaneous non-rotatable engagement when the thread indexing ring is in its unlocking position.

14. A gas pressure regulator as defined in claim 13 wherein the first, second and third engagement portions each have a respective generally polygonal cross section.

15. A gas pressure regulator as defined in claim 14 wherein the cross sections are substantially identical to one another.

16. A gas pressure regulator comprising:
a regulator body including a proximal portion, a distal portion and an intermediate portion generally therebetween, a main bore extending through the regulator body from the proximal portion through the distal portion, the proximal portion being adapted to be received by a pressurized gas reservoir in sealed engagement therewith, the intermediate portion including at least two generally radially-extending ports in fluid communication with the main bore, the ports respectively being adapted to removably receive a pressure gauge and a fill nipple assembly;

a shuttle subassembly operably housed generally within the main bore, the shuttle subassembly including a shuttle rod and a shuttle spring;

an adaptor sleeve in axial receipt of the distal portion and including an outer threading adapted to threadably engage an air source adaptor of a paintball marker;

a retainer element including a threaded portion adapted to threadably engage the main bore generally within the distal portion thereby axially securing the adaptor sleeve onto the distal portion; and a thread indexing ring in receipt of the distal portion for axial movement between a locking position and an unlocking position, wherein the adaptor sleeve is rotatable with respect to the regulator body when the thread indexing ring is in its unlocking position, and the adaptor sleeve is rendered substantially non-rotatable with respect to the regulator body when the thread indexing ring is in its locking position, the thread indexing ring being biased toward its locking position, the bias adapted to being overcome by direct manipulation by an operator of the paintball marker.

17. A gas pressure regulator as defined in claim 16 wherein the bias is provided by magnetic interaction between the thread indexing ring and at least one magnet secured substantially within the intermediate portion.

18. A gas pressure regulator as defined in claim 16 wherein the bias is provided by a spring element.

19. A gas pressure regular as defined in claim 1 wherein when the thread indexing ring is in its unlocking position the adaptor sleeve is selectively rotatable to any of a plurality of indexed orientations even while the gas pressure regulator remains in a pressurized state.

20. A paintball marker system comprising:
a paintball marker including an air source adaptor;
a reservoir for pressurized gas; and
a gas pressure regulator in fluid communication between the air source adaptor and the reservoir, the gas pressure regulator including:

(a) a regulator body including a proximal portion, a distal portion and an intermediate portion generally therebetween, a main bore extending through the regulator body from the proximal portion through the distal portion, the proximal portion being received by the reservoir in sealed engagement therewith, the intermediate portion including at least two generally radially-extending ports in fluid communication with the main bore, the ports respectively being in receipt of a pressure gauge and a fill nipple assembly;

(b) a shuttle subassembly operably housed generally within the main bore, the shuttle subassembly including a shuttle rod and a shuttle spring;

(c) an adaptor sleeve in axial receipt of the distal portion and including an outer threading in threaded engagement with the air source adaptor;

(d) a retainer element including a threaded portion adapted to threadably engage the main bore generally within the distal portion thereby axially securing the adaptor sleeve onto the distal portion; and (e) a thread indexing ring in receipt of the distal portion for axial movement between a locking position and an unlocking position, wherein the adaptor sleeve is rotatable with respect to the regulator body when the thread indexing ring is in its unlocking position, and the adaptor sleeve is rendered substantially non-rotatable with respect to the regulator body when the thread indexing ring is in its locking position, the thread indexing ring being biased toward its locking position, the bias adapted to being overcome by direct manipulation by an operator of the paintball marker.

\* \* \* \* \*